United States Patent [19]

Katoh et al.

[11] Patent Number: 4,519,354
[45] Date of Patent: May 28, 1985

[54] FUEL SUPPLY SYSTEM IN INTERNAL COMBUSTION ENGINE

[75] Inventors: Yuuichi Katoh; Hiroki Matsuoka; Minoru Iwata, all of Susono, Japan

[73] Assignee: Toyota Jidosha Kabushiki Kaisha, Toyota, Japan

[21] Appl. No.: 490,114

[22] Filed: Apr. 29, 1983

[30] Foreign Application Priority Data

Apr. 30, 1982 [JP] Japan .................................. 57-72496

[51] Int. Cl.³ .............................................. F02B 33/00
[52] U.S. Cl. .................................... 123/472; 123/541; 123/468; 123/531
[58] Field of Search ............... 123/541, 585, 586, 587, 123/472, 531, 468

[56] References Cited

U.S. PATENT DOCUMENTS

| | | | |
|---|---|---|---|
| 3,593,694 | 7/1971 | Hilborn | 123/541 |
| 3,788,287 | 1/1974 | Falen | 123/472 |
| 3,826,233 | 7/1974 | Mennesson | 123/472 |
| 4,216,753 | 8/1980 | Inoue | 123/531 |

Primary Examiner—Ronald B. Cox
Attorney, Agent, or Firm—Cushman, Darby & Cushman

[57] ABSTRACT

In a fuel supply system in an internal combustion engine, comprising: injectors for injecting fuel; a fuel flow path for supplying the fuel to the injectors; and an assist air flow path for supplying assist air to expedite spraying of the fuel to the neighborhood of jets of the injectors; part of the assist air flow path is disposed in close contact with part of the fuel flow path, so that the part of the fuel flow path can be thermally insulated and/or cooled by assist air flowing through the assist air flow path.

2 Claims, 4 Drawing Figures

FUEL SUPPLY SYSTEM IN INTERNAL COMBUSTION ENGINE

BACKGROUND OF THE INVENTION

1. Field of the Invention

This invention relates to fuel supply systems in internal combustion engines, and more particularly to improvements in a fuel supply system for an internal combustion engine, suitable for use in an engine of a motor vehicle provided with an electronic fuel injection device, and comprising injectors for injecting fuel, a fuel flow path for supplying fuel to the injectors and an assist air flow path for supplying assist air to expedite the spraying of fuel to the neighborhood of jets of the injectors.

2. Description of the Prior Art

Systems for controlling an air-fuel ratio of a gas mixture in an internal combustion engine of a motor vehicle and the like include one wherein an electronic fuel injection device is used. In this internal combustion engine provided with the electronic fuel injection device, a fuel injection time is determined in accordance with an intake air flow rate of the engine and an engine rotational speed for example, and injectors provided on an intake manifold for example, for injecting fuel towards an intake port of the engine are opened, whereby the air-fuel ratio of the engine is controlled, and hence, these electronic fuel injection devices have been widely used in the engines for motor vehicles, wherein the air-fuel ratio must be precisely controlled and an exhaust emission control measure is taken. In the internal combustion engines provided with the electronic fuel injection device of the type described, in general, there is provided a fuel delivery pipe passing through the neighborhood of the rear portion of the respective injectors, and fuel is adapted to be supplied to the respective injectors through the fuel delivery pipe. However, when a continuous high load driving is effected under high temperature for example, fuel is evaporated in the fuel delivery pipe, and a sufficient supply of fuel is not injected from the injectors due to a vapor lock, whereby the air-fuel ratio tends to become lean. To obviate the above-described disadvantage, heretofore, the fuel delivery pipe has been spaced apart from a heat source such as an exhaust manifold, which, however, could not obtain a satisfactory result.

On the other hand, recently, such an attempt has been made that part of intake air is fed to the neighborhood of the jets of the injectors to improve the spraying of the fuel to be injected from the injectors by the flow velocity of air, thus enabling to obtain a certain result. However, heretofore, the assist air piping has been disposed independently of the aforesaid fuel delivery pipe and the like, being not utilized for cooling the fuel or the like.

In addition, it is conceivable to provide a separate fuel cooling device, which, however, may result in complicated construction and increased costs.

SUMMARY OF THE INVENTION

The present invention has been developed to obviate the above-described disadvantages of the prior art and has as its first object the provision of a fuel supply system in an internal combustion engine, wherein by only changing a flow path of assist air partially, part of a fuel flow path can be thermally insulated or cooled effectively by the assist air, thereby enabling to be freed from a vapor lock and the like.

A second object of the present invention is to provide a fuel supply system in an internal combustion engine, wherein higher effects of thermal insulation and cooling are obtained by the assist air flow path.

A third object of the present invention is to provide a fuel supply system in an internal combustion engine, wherein the assist air flow path is simplified in construction and the piping work is facilitated.

A forth object of the present invention is to provide a fuel supply system in an internal combustion engine, wherein the assist air flow path has a high radiating effect.

A fifth object of the present invention is to provide a fuel supply system in an internal combustion engine, wherein the assist air can be smoothly distributed.

A sixth object of the present invention is to provide a fuel supply system in an internal combustion engine, wherein the assist air flow path has a high cooling effect.

To achieve the aforesaid first object, the present invention contemplates that a fuel supply system in an internal combustion engine comprises:

injectors for injecting fuel;

a fuel flow path for supplying the fuel to the injectors; and an assist air flow path for supplying assist air to expedite spraying of the fuel to the neighborhood of jets of the injectors, wherein part of the assist air flow path is disposed in close contact with part of the fuel flow path, whereby the part of the fuel flow path is thermally insulated and/or cooled by assist air flowing through the assist air flow path.

To achieve the aforesaid second object, the present invention contemplated that part of the assist air flow path covers an outer periphery of a fuel delivery pipe.

To achieve the aforesaid third object, the present invention contemplated that the part of the assist air flow path is disposed in parallel to and in close contact with a fuel delivery pipe.

To achieve the aforesaid fourth object, the present invention contemplates that fines are formed on an inner wall surface of the assist air flow path being in contact with the fuel delivery pipe.

To achieve the aforesaid fifth object, the present invention contemplates that the part of the assist air flow path disposed in close contact with the part of the fuel flow path is integrally formed with a fuel delively pipe so as to provide an assist air delivery pipe for distributing assist air to the respective injectors.

To achieve the aforesaid sixth object, the present invention contemplates that flow of the assist air flowing through the assist air flow path disposed in close contact with the part of the fuel flow path is made opposite in direction to flow of the fuel flowing through the fuel flow path.

According to the present invention, the part of the fuel piping can be thermally insulated or cooled by the assist air flowing through the assist air piping without requiring to provide a separate cooling device, and the fuel is prevented from being evaporated to avoid the disadvantage such as a vapor lock. Particularly, the flow rate of the assist air during running can be increased to be more than the flow rate thereof during idling through the control by an air control valve, so that the value of fuel vapor generated during running under high temperature can be decreased to a considerable extent.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the embodiments of the present invention with reference to the drawings.

Figure 1:
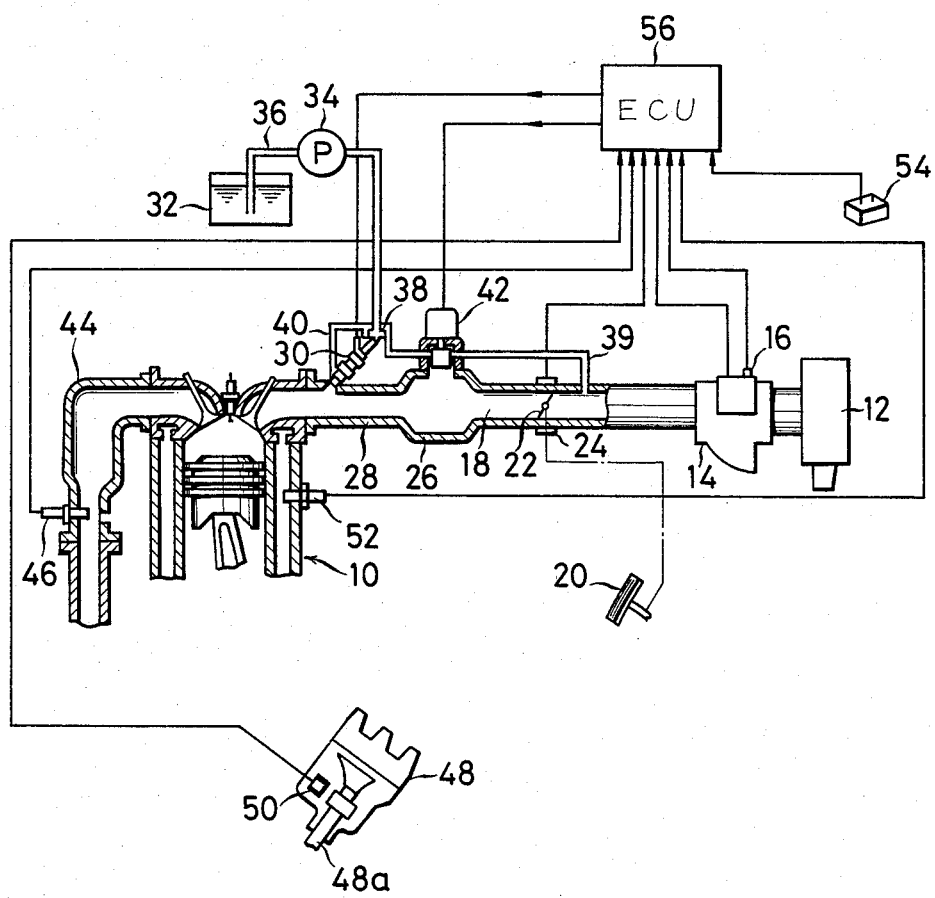
FIG. 1 is a block diagram showing the arrangement of the electronic fuel injection device of an engine for a motor vehicle provided thereon with a first embodiment of the fuel supply system in an internal combustion engine according to the present invention.

The first embodiment of the present invention, as shown in FIG. 1, is constructed such that, in an electronic fuel injection device of an engine 10 for a motor vehicle, comprising:

an air cleaner 12 for taking external air in;

an air flow meter 14 for detecting a flow rate of air taken in through the air cleaner 12;

an intake air temperature sensor 16 incorporated in the air flow meter 14, for detecting the temperature of the intake air;

a throttle valve 22 provided in an intake pipe 18 and rotatable in association with an accelerator pedal 20 provided at a driver's seat, for controlling the flow rate of the intake air;

a throttle sensor 24 for detecting the opening degree of the throttle valve 22;

a surge tank 26 for precluding an intake air interference from occurring;

injectors 30 provided on an intake manifold 28, for injecting fuel towards intake ports of an engine 10;

a fuel tank 32, a fuel pump 34, a fuel piping 36 and a fuel delivery pipe 38, for supplying fuel under predetermined pressure to the injectors 30;

an air control valve 42 for supplying part of the intake air to regulate the idling rotation (hereinafter referred to as "idle air") taken in from the upstream side of the throttle valve 22 of the intake pipe 18 through an idle air piping 39 to the neighborhood of jets of the injectors 30 through an assist air piping 40 as the assist air to expedite the spraying of the fuel, and further, for directly supplying the remaining part into the surge tank 26;

an oxygen concentration sensor (hereinafter referred to as "O₂ sensor") 46 provided in an exhaust manifold 44, for sensing an air-fuel ratio from a residual oxygen concentration in the exhaust gas;

a distributor 48 having a distributor shaft 48a rotatable in association with the rotation of a crankshaft of the engine 10;

a crank angle sensor 50 incorporated in the distributor 48, for outputting a crank angle signal in accordance with the rotations of the distributor shaft 48a;

a coolant temperature sensor 52 provided on an cylinder block of the engine 10, for sensing the temperature of an engine coolant;

a battery 54; and an electronic control unit (hereinafter referred to as "ECU") 56 for determining a basic fuel injection time in accordance with an intake air flow rate obtained from an output of the air flow meter 14 and an engine rotational speed obtained from a crank angle signal outputted from the crank sensor 50, and for correcting the basic fuel injection time in accordance with the opening degree of the throttle valve 22 outputted from the throttle sensor 24, the air-fuel ratio outputted from the O₂ sensor 46, the engine coolant temperature outputted from the coolant temperature sensor 52, a voltage of the battery 54 and the like, whereby an opening time signal is outputted to the injectors 30, and the air control valve 42 is controlled in accordance with the operating conditions of the engine.

Figure 2:
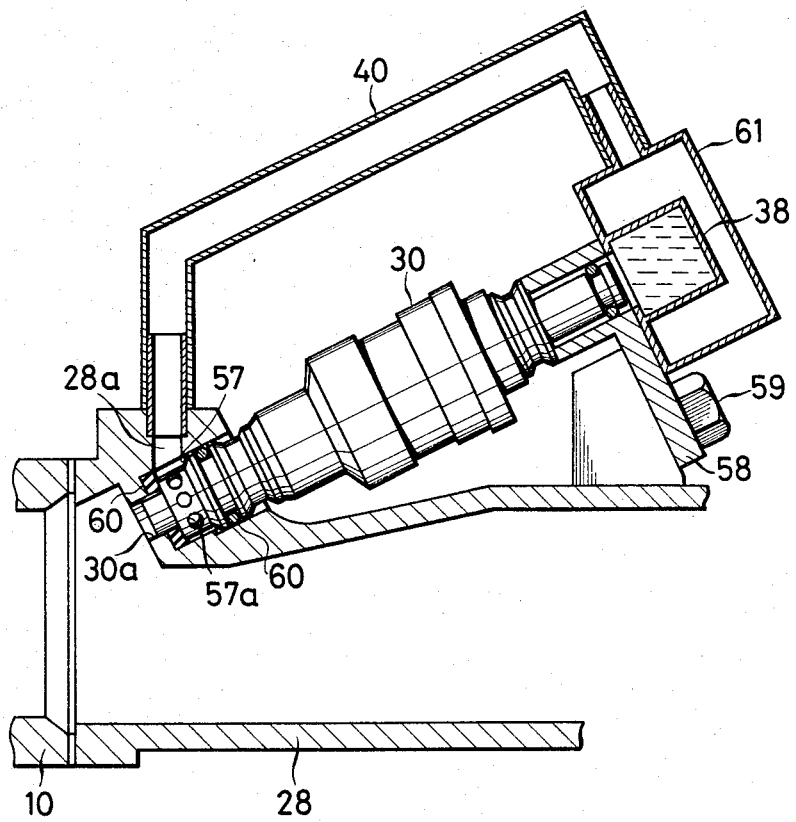
FIG. 2 is an enlarged sectional view showing the arrangement of the neighborhood of the injector in the aforesaid first embodiment.

As detailedly shown in FIG. 2, part of the assist air piping 40 is integrally formed with the fuel delivery pipe 38 in a manner to cover the outer periphery of the fuel delivery pipe 38 in a substatially U-shape so as to provide an assist air delivery pipe 61 for distributing the assist air to the respective injectors 30, and the flow of the assist air in the assist air delivery pipe 61 is made opposite in direction to the flow of the fuel delivery pipe 38, so that the fuel delivery pipe 38 can be thermally isolated or cooled by the assist air flowing through the assist air delivery pipe 61.

In FIG. 2, designated at 57 is an adapter having assist air introducing openings 57a provided on the forward end portion of the injector 30, for introducing the assist air to the vicinity of a jet 30a of the injector;

58 a flange affixed to the undersurface of the assist air delivery pipe 61 integrally formed with the fuel delivery pipe 38;

59 a bolt for fixing the assist air delivery pipe 61 to the intake manifold 28 through the flange 58;

28a an assist air path formed on the intake manifold 28, for communicating the assist air piping 40 with the neighborhood of the adapter 57 of the injector; and 60 seals for isolating the neighborhood of the assist air introducing openings 57a of the adapter 57 from the intake path in the intake manifold 28 and the external air.

Figure 3:
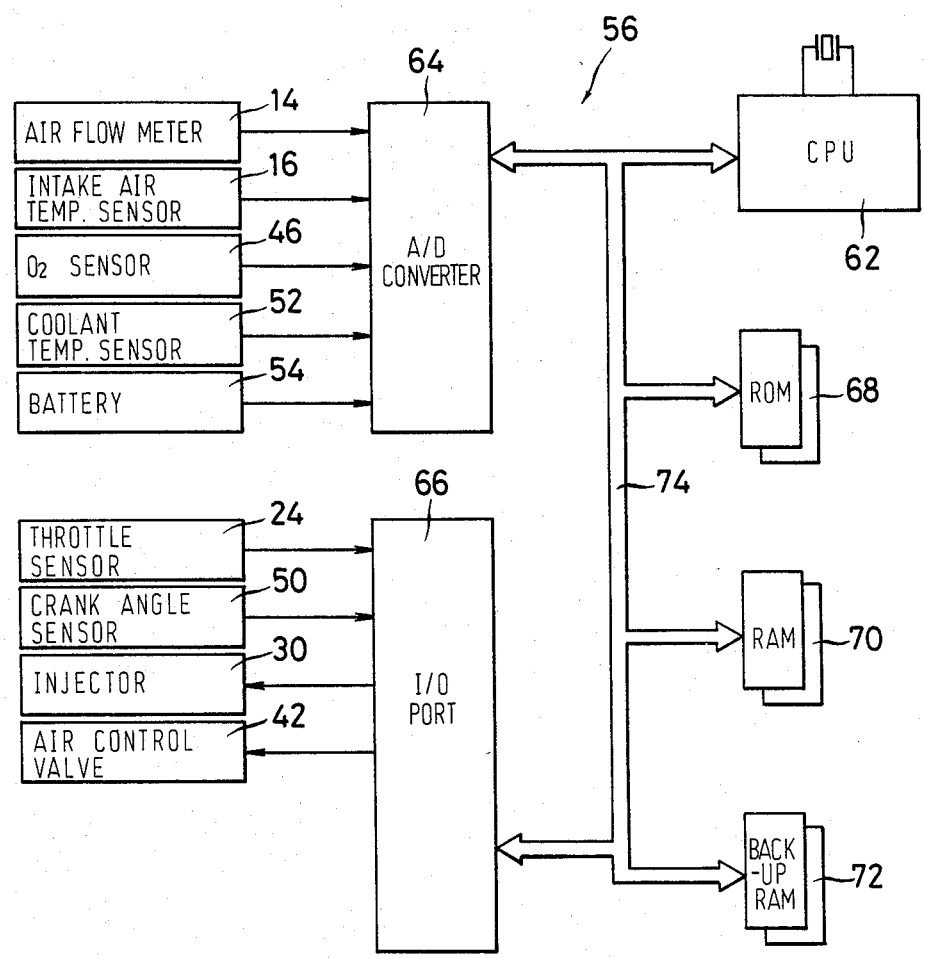
FIG. 3 is a block diagram showing the arrangement of a digital control circuit used in the aforesaid electronic fuel injection device.

As shown in FIG. 3 in detail, the digital control circuit 56 comprises:

a central processing unit (hereinafter referred to as an "CPU") 62 including a microprocessor for carrying out various operational processing;

an analogue-digital converter (hereinafter referred to as an "A/D converter") 64 with a multiplexer, for converting analogue signals outputted from the air flow meter 14, the intake air temperature sensor 16, the O₂ sensor 46, the coolant temperature sensor 52, the battery 54 and the like into digital signals and successively taking the same into the CPU 62;

an input/output port (hereinafter referred to as an "I/0 port") 66 with a buffer, for taking digital signals outputted from the throttle sensor 24, the crank angle sensor 50 and the like into the CPU 62 at a predetermined timing, and outputting the result of operation by the CPU 62 to the injectors 30, the air control valve 42 and the like at a predetermined timing;

a Read Only Memory (hereinafter referred to as a "ROM") 68 for storing control programs, various data and the like;

a Randam Access Memory (hereinafter referred to as a "RAM") 70 for temporarily storing operational data in the CPU 62 and the like;

a backup RAM 72 capable of being supplied with current from an anxiliary power source to hold memory when the engine is stopped in operation; and a common bus 74 for connecting the aforesaid components to one another.

In this embodiment, the fuel filled up in the fuel delivery pipe 38 is thermally insulated from the engine room heated high temperature and cooled by the assist air flowing through the assist air delivery pipe 61 covering the outer periphery of the fuel delivery pipe 38, so that the fuel delivery pipe 38 can be effectively freed from vapor lock.

Detailed description will now be given of the second embodiment of the present invention.

Figure 4:
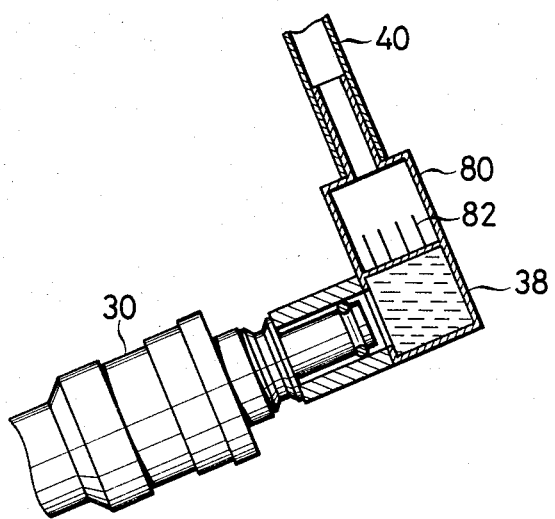
FIG. 4 is a sectional view showing the arrangement of the neighborhood of the injector in a second embodiment of the fuel supply system in an internal combustion engine according to the present invention.

This embodiment, similarly to those of the first embodiment as shown in FIG. 1, is constructed such that, in an fuel injection device of an engine 10 for a motor vehicle, comprising: the air cleaner 12; the air flow meter 14; the intake air temperature sensor 16; the intake pipe 18; the accelerator pedal 20; the throttle valve 22; the throttle sensor 24; the surge tank 26; the intake manifold 28; the injectors 30; the fuel tank 32; the fuel pump 34; the fuel piping 36; the fuel delivery pipe 38; the idle air piping 39; the assist air piping 40; the air control valve 42; the exhaust manifold 44; the O2 sensor 46; the distrubutor 48; the crank angle sensor 50; the coolant temperature sensor 52; the battery 54 and the ECU 56;

as shown in FIG. 4 in detail, part of the assist air piping 40 is integrally formed with the fuel delivery pipe 38 in a manner to be disposed in parallel to and in close contact with the fuel delivery pipe 38 so as to provide an assist air delivery pipe 80 for distributing the assist air to the respective injectors 30, and the flow of the assist air in the assist air delivery pipe 80 is made opposite in direction to the flow of the fuel in the fuel delivery pipe 38, so that the fuel delivery pipe 38 can be cooled by the assist air flowing through the assist air delivery pipe 80.

Formed on a wall surface of the assist air delivery pipe 80 being in contact with the fuel delivery pipes 38 are fins 82 for improving the radiating effect.

In this embodiment, the assist air delivery pipe 80 is disposed in parallel to and in close contact with the fuel delivery pipe 38, whereby, although this embodiment is slightly inferior in the effects of thermal insulation and cooling to the aforesaid first embodiment, this embodiment is simplified in construction and facilitated in its piping work.

Furthermore, in both the preceding embodiments, part of the assist air piping 40 is disposed in close contact with the fuel delivery pipe 38, however, the locality where the fuel piping is thermally isolated or cooled need not necessarily be limited to this, but, needless to say, it is possible to arrange any other portion of the fuel piping to be thermally isolated or cooled.

In both the preceding embodiments, part of the assist air delivery piping 40 being in close contact with the fuel piping is formed into an assist air delivery pipe, however, the arrangement of the assist air piping need not necessarily be limited to this, but, needless to say, it is possible to dispose an assist air piping other than the assist air delivery pipe in close contact with the fuel piping.

It should be apparent to those skilled in the art that the above-described embodiments are merely representative, which represent the appilications of the principles of the present invention. Numerous and varied other arrangements can be readily devised by those skilled in the art without departing from the spirit and the scope of the invention.

What is claimed is:

1. A fuel supply system of an internal combustion engine, comprising:
    an injector for injecting fuel;
    a fuel flow path for supplying fuel to said injector; and
    an assist air flow path for supplying assist air to expedite spraying of the fuel to the neighborhood of a jet of said injector, wherein at least part of said assist air flow path is disposed in direct contact with a part of said fuel flow path on an engine compartment side thereof, said part covering an outer periphery of a fuel delivery pipe in a substantially U-shape, whereby said part of the fuel flow path is thermally insulated from the engine compartment and cooled by assist air flowing through said assist air flow path.

2. A fuel supply system of an internal combustion engine, comprising:
    an injector for injecting fuel;
    a fuel flow path for supplying fuel to said injector; and
    an assist air flow path for supplying assist air to expedite spraying of the fuel to the neighborhood of a jet of said injector, wherein at least part of said assist air flow path is disposed in direct contact with a part of said fuel flow path on an engine compartment side thereof, the flow of assist air flowing through the assist air flow path disposed in direct contact with said part of the fuel flow path being compeletely opposite in direction to the direction of flow of the fuel flowing through the fuel flow path, whereby said part of the fuel flow path is thermally insulated from the engine compartment and cooled by assist air flowing through said assist air flow path.

* * * * *